United States Patent Office 3,472,379
Patented Oct. 14, 1969

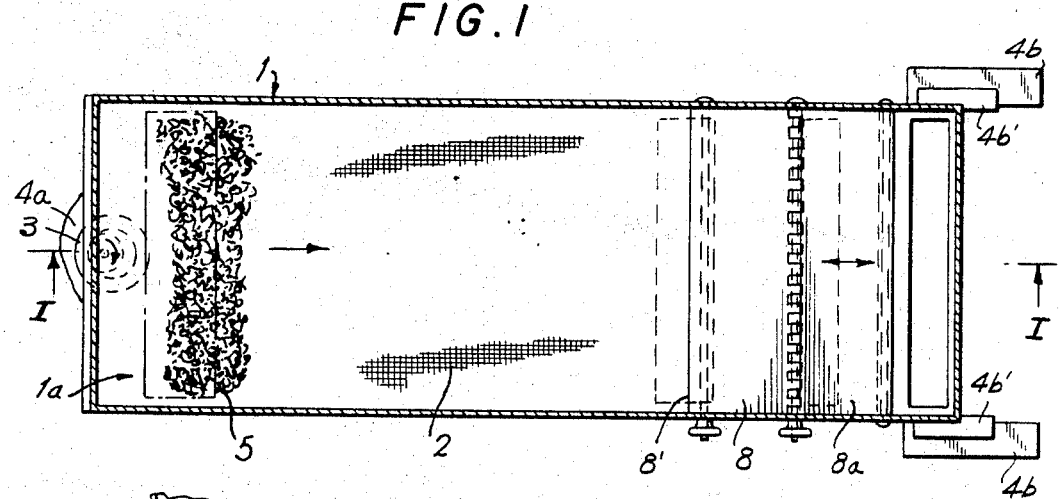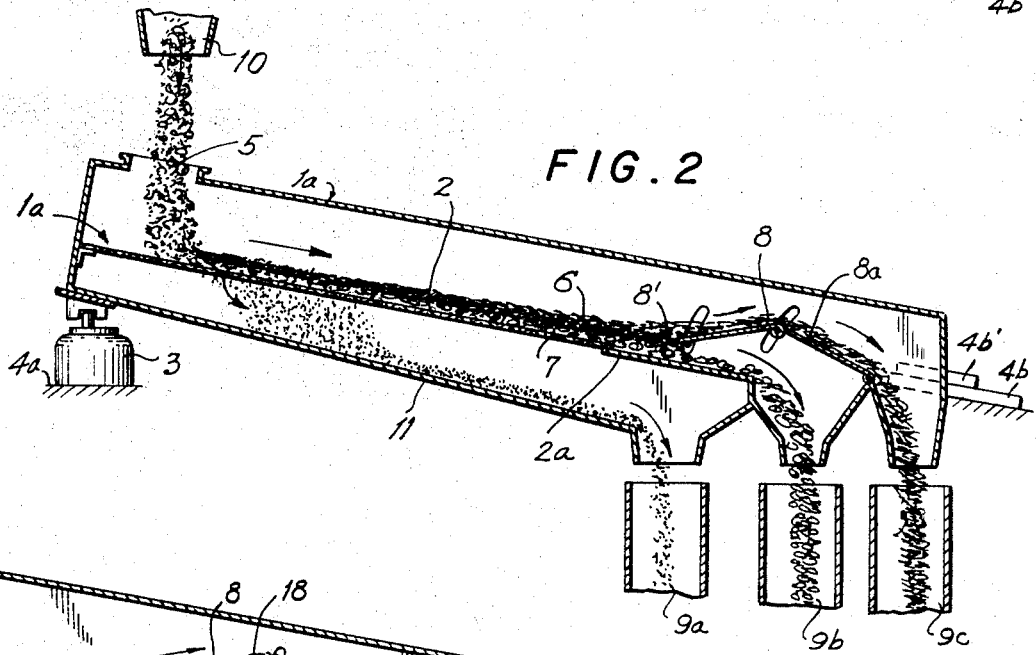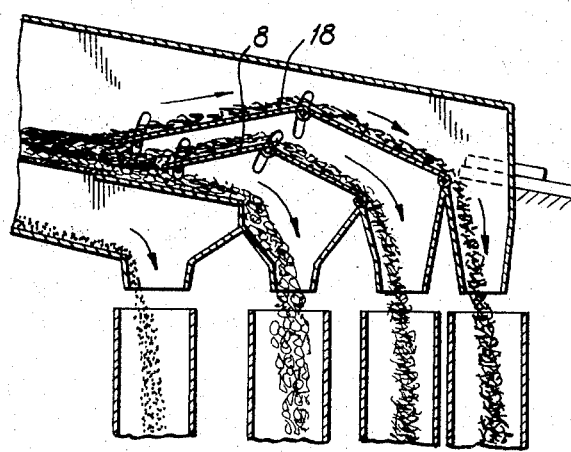

3,472,379
SEPARATION PROCESS
Telemahos G. Lainas, Waterbury, and Roderick R. Gaetz, Oxford, Conn., assignors to Uniroyal, Inc., New York, N.Y.
Filed June 12, 1967, Ser. No. 645,188
Int. Cl. B07b *13/08*
U.S. Cl. 209—479                                10 Claims

---

ABSTRACT OF THE DISCLOSURE

Reclaiming of rubber from a mixture of rubber and fiber pieces by stratifying the mixture and mechanically separating an upper from a lower stratum thereof substantially along a plane intermediate the upper and lower stratum.

---

This invention relates to the separation of a mixture into its high bulk density, intermediate bulk densities and low bulk density components. More specifically this invention relates to the reclamation of rubber from a mixture of rubber and fiber pieces.

Many rubber articles are known which are reinforced or otherwise strengthened with textile fibers or the like. As used here the term "rubber" is intended to include natural and synthetic rubber as well as all rubber-like elastomeric materials. In the case of such rubber articles, particularly in the case of vehicular tires, substantial amounts of rubber remain on the product after the product is no longer suitable for its intended use. Thus, old, damaged, worn, or for other reasons unusable tires still possess substantial amounts of rubber.

In reclaiming the rubber from reinforced articles such as tires the latter are ground, shredded, or by any other process reduced to the form of a heterogeneous mixture comprising pieces of rubber and pieces of reinforcing material e.g. fiber, and pieces which contain a mixture of each. In a tire, the reinforcing material is usually in the form of fibers of rayon, nylon, glass or similar material having a relatively low bulk density in fibrous form. The mixture consists of pieces of rubber of widely varying size, from tiny granules to substantial chunks, fibers of varying lengths and material, and combined fiber and rubber pieces remaining, at this stage of the process, still attached to one another. The method according to the present invention is most useful in that stage of the reclaiming process just described i.e. where independent pieces of rubber and fiber and pieces of loosely connected rubber and fiber have been formed and it is desired to segregate out the rubber pieces.

It is known to pass such a mixture over consecutive vibrating screens of varying mesh in an effort to separate the rubber from the mixture. The latter procedure has been found to be high disadvantageous, however, since it is essentially a size distinguishing arrangement rather than one which permits good separation between rubber and fiber pieces. Other devices and processes are also known in which a stream of air or other fluid medium is either passed through and/or over the mixture on the vibrating screen for the purpose of entraining the lighter components of the mixture while the latter is being vibrated. The grave disadvantage of these processes, however, is that when used with rubber-fiber mixtures, the very small, i.e. fine, rubber pieces will also be entrained by the stream of air which latter is, of course, intended to entrain and carry away only the light fiber pieces. The latter process, it will be seen, operates on a weight principle so that small enough pieces of rubber i.e., those whose weight is in the same range as the pieces of fiber, will also be entrained by the air stream and carried away together with the fiber pieces.

It is, therefore, an object of the present invention to provide a process for more efficiently separating the rubber from a mixture of rubber and fiber pieces.

It is another object of the present invention to provide a comparatively simple and economical method for accomplishing the above.

It is still another object of the present invention to accomplish the above without the use of additional fluid means.

A still further object of the present invention is to separate rubber from a mixture of rubber and fiber pieces by a method which is not primarily dependent upon the size or the weight of the individual pieces.

A concomitant object of the present invention is to provide a method for accomplishing the above which is based solely on the apparent bulk density of the materials which constitute the mixture.

According to the present invention the mixture of rubber and fiber pieces is stratified into an upper layer comprising predominantly fiber pieces of relatively lower bulk density, and a lower layer compising predominantly rubber particles of relatively higher bulk density. These layers are then permanently separated from eather other substantially along a plane located intermediate of and substantially parallel to said upper and lower layers.

Other objects and advantages of the present invention will become apparent from the following description of the preferred form of the invention, reference being had to the accompanying drawings in which:

FIG. 1 is a partly cut away top plan view of an apparatus for carrying out the process of the presentt invention;

FIG. 2 is a transverse sectional view taken along line I—I in direction of the arrows in FIG. 1; and FIG. 3 is a partial transverse, sectional view of a separator for carrying out a modified process according to the present invention.

Referring to the drawing, the frame 1 of the device is supported at one end by supports 4b, and at the other end—via an agitating device 3—by support 4a. The agitating device 3, for shaking frame 1, may be of well known construction including, for example, a motor having an eccentric rotating pin at one end of its shaft. It will be understood, of course, that other agitating devices well known to those skilled in the art may be used. The frame 1 is supported in an inclined position with the inlet region 1a elevated, so that when it is agitated the rubber and fiber mixture 5, deposited in the inlet region 1a will gradually flow downwardly toward the lower discharge end of frame 1. The frame 1 includes a mixture supporting surface preferably in the form of a fine mesh screen 2. At the lower, discharge, end of the frame 1 are located three discharge openings for guiding separated material into collecting hoppers 9a, 9b and 9c respectively. Preferably the frame 1 is supported in a well known manner permitting the agitating device 3 to oscillate the inlet region 1a of the frame and therewith the screen 2 in substantially its own plane. The lower end of frame 1 is guided by slide shoes 4b' for more nearly linear back and forth movement along the planar upper surfaces of supports 4b.

Screen 2 preferably extends from the upper end of frame 1 downwardly to a point about ⅔ the distance to the lower end and may be in the form of a perforated plate whose perforations are approximately ⅛ inch in size, although this dimension may be varied under different conditons and, in fact, the perforations may be eliminated entirely. In the region of the lower end of screen 2 there is located a separator member in the form of an adjustable blade 8 which is fastened at opposite sides thereof to the opposite side walls of frame 1. The latter side walls are provided with curved slots so as to permit both angular and height adjustment to blade 8. By such adjustment, therefore, not only the angle of inclination of blade 8 but also the height of its leading edge above the screen 2, may be varied. Blade 8 constitutes a separator means for separating the rubber from the fiber pieces of the mixture, and preferably includes a hinged trailing blade portion 8a hinged also to frame 1.

Frame 1 includes a solid bottom 11 located below the screen 2 and covering the entire lower side thereof. Bottom 11 may be parallel to frame 2 or may be inclined even further so that rubber pieces passing through the perforations of screen 2 will travel downwardly and be delivered at the lower end into a suitable collecting means such as the hopper 9a. The rubber pieces flowing along the screen 2 and over a plate 2a located at the lowermost end of the screen 2, are delivered, downstream of the leading edge of blade 8, to a suitable collecting means such as hopper 9b.

The portion of the mixture which cannot flow under the leading edge of blade 8 will eventually flow over blade 8 beyond the trailing edge thereof and will be delivered, via portion 8a, into another suitable collecting means such as hopper 9c.

The operation of the device and the method of separating the rubber pieces from the mixture of rubber and fiber pieces will now be described. The mixture of rubber and fiber pieces is discharged through hopper 10 onto the upper end of screen 2. As the frame 1 and the materials thereon are agitated the higher bulk density pieces, i.e. the rubber pieces, both the large as well as the small, will work to the bottom of the mixture while the lower bulk density pieces, i.e., the fiber pieces, will remain on top of the rubber pieces. By the time the mixture reaches the vicinity of the leading edge of blade 8 it has thus been stratified into at least two layers, the lower layer consisting predominantly of rubber pieces and the upper layer consisting predominantly of fiber pieces. The agitation of the frame, however, not only causes stratification of the mixture, but also assists gravity in causing the mixture to flow downwardly along the inclined surface of screen 2 toward the lower end of the frame. In addition, where the supporting surface does comprise perforations, the small rubber particles are urged by the agitating movement to pass through such perforations of screen 2 for delivery into collecting hopper 9a. When the mixture 5 reaches the lower end of screen 2 it is in stratified condition so that the predominantly fiber upper layer 6 thereof may be readily skimmed off by the leading edge 8' of blade 8, while the predominantly rubber lower layer 7 of the mixture is allowed to pass between the edge 8' and the plate 2a for delivery into collecting hopper 9b.

The height of leading edge 8' of blade 8 above the surface of plate 2a is preferably adjusted to suit the particular coarseness of the mixture being processed. It is preferred to adjust the height of edge 8' to a distance at least slightly exceeding the size of the largest rubber pieces present in the mixture, so that these may pass beneath the edge 8'. Similarly, angular adjustment of blade 8 permits any desired retardation of rubber and fiber pieces, resulting in any desired bed thickness of the mixture in the region directly upstream of edge 8'. This retarding effect allows such rubber pieces which have not found the bottom of the mixture to further settle so that they too will pass out beneath the leading edge 8', and further, by increasing the angle of inclination of blade 8 and thus increasing the bed thickness of the mixture a more accurate separation between the lower rubber and the upper fiber layers is made possible. Thus, by simply adjusting the elevation and inclination of blade 8, the bed thickness and/or the thickness of the skimmed layer may be easily varied.

The upper fiber stratum passes over the upper or trailing edge of blade 8 and is delivered via trailing portion 8a into collecting hopper 9c. According to the present invention, therefore, the rubber and fiber pieces of the stratified mixture 5 are separated by the leading edge of blade 8 substantially along a plane intermediate of and parallel to the upper fiber and lower rubber layers of the mixture.

As illustrated in FIG. 3, by using a plurality of vertically stacked blades, such as blades 8, and 18, each arranged to deliver to a corresponding collecting hopper, additional intermediate layers of the stratified mixture may be conveniently separated out.

The rubber in vehicular tires such as natural, SBR, and other synthetics, generally has a bulk density in the range of approximately 20 to 30 pounds per cubic foot, while the fibers used for reinforcement therein, such as rayon, nylon, cotton, glass, polyester, have bulk densities generally in the range of approximately 5 to 7 pounds per cubic foot. It has been found that with a mixture of rubber and fiber pieces, particularly where the bulk density of the rubber is of the order of 3 to 4 times the bulk density of the fiber, the mixture begins to stratify almost immediately upon contact with the agitating supporting surface. As noted above, the thickness of the mixture bed may be increased by increasing the angle at which the blade 8 is inclined with respect to the surface of screen 2. Increase in bed thickness, it will be seen, increases the height over which the rubber-fiber gradient of the stratified mixture is measurable in the region of edge 8' so that the height of the plane along which the stratified mixture is separated by edge 8' is less critical, whereby a more accurate separation is possible.

It will be noted that in accordance with the present invention no fluid or fluidizing medium such as air is required or used in the separation process, thus making the present process substantially different from the known methods of separating rubber from a mixture of fiber and rubber pieces.

Upon stratification, substantially parallel upper and lower layers of fiber and rubber pieces, respectively, are formed and are separated by the leading edge of blade 8, substantially along a plane intermediate said layers and parallel thereto. Good stratification has been achieved with an oscillating movement at a frequency of approximately 200 to 225 r.p.m. and an amplitude of approximately 2 to 3 inches.

By way of example, a 20 inch by 54 inch Robinson sifter screen ("GyroSifter" made by the Mercer-Robinson Co. Inc., Munsey, Pa., Model Size #10) was used at an angle of inclination of approximately 3.7 degrees from the horizontal. The leading edge 8' of the separation blade was set to a height of ¾" to 1" above the surface of a plate 2a and blade 8 was inclined approximately 12 degrees with respect to plate 2a. The amplitude of oscillation of the frame was approximately 2½ inches, both in eccentric throw at the upper end, and longitudinal movement at the lower discharge end thereof. An input feed mixture was supplied consisting approximately of 18% fiber and 82% rubber (by weight) and having pieces of the following size distribution:

| Mesh: | Percentage retained |
| --- | --- |
| ⅜ | 0.5 to 4.0 |
| ¼ | 22 to 36 |
| 4 | 17 to 31 |
| 8 | 7 to 30 |
| 10 | 2 to 3 |
| Thru 16 | 16 to 22 |

The overall bed thickness was found to be approximately in the range of 3 to 4 inches in the region of edge 8'. The above distribution was determined by sifting the mixture with consecutive screens having the above indicated mesh. The indicated percentage (by weight) of material remained, i.e., was retained by a screen having the respective mesh.

Operating under the above condition, the clean rubber discharge, i.e., the materials collected in hoppers 9a and 9b contained 5.2% (by weight) of fiber, compared with hopper 9c which was found to contain 29.5% (by weight) of fiber. The frequency of oscillation for the foregoing run was between 208 and 216 r.p.m., while frequencies in the range of 200 to 225 r.p.m. are readily acceptable.

The above example is given for illustrative purposes only and is not intended to limit the scope of the present invention, which is defined by the following appended claims.

Having thus described our invention, what we claim and desire to protect by Letters Patent is:

1. In the process of reclaiming the relatively higher bulk density rubber from a mixture of rubber and fiber pieces derived from processing rubber articles reinforced with fibers of substantially lower bulk density, the steps of:
   agitating the mixture so as to stratify the latter into at least an upper stratum of predominantly fiber pieces and a lower substantially parallel stratum of predominantly rubber pieces, said stratification of said mixture being accomplished without passing a fluidizing medium therethrough;
   and permanently separating the upper and lower strata from each other substantially along a plane intermediate of and substantially parallel to said upper and lower strata.

2. The method according to claim 1, comprising feeding the mixture of rubber and fiber pieces onto an elevated region of an inclined supporting surface, said agitation being accomplished by agitating said supporting surface whereby the mixture is caused to flow downwardly along said surface in response to said agitation.

3. The method according to claim 2, wherein said separating comprises providing separator means down-stream of said elevated region for dividing the mixture along said first mentioned plane as the stratified mixture flows downstream along said support surface.

4. The method according to claim 3, further comprising placing the separator means at an elevation above said support surface which exceeds only slightly the vertical height of the largest rubber pieces in the mixture so that the latter are able to pass between the separator means and said support surface.

5. The method according to claim 1, further comprising providing, respectively, a rubber-collecting station and a fiber-collecting station and delivering said lower and upper stratum to the respective collecting station after separation thereof.

6. The method according to claim 1, wherein the bulk-density of the rubber in the mixture is of the order of 3–4 times the bulk-density of the fiber in the mixture.

7. The method according to claim 1, wherein the rubber articles are scrap tires in which the rubber has a bulk density of approximately 20–30 lb./cu. ft. and the fiber has a bulk density of approximately 5–7 lb./cu. ft.

8. The method according to claim 1, wherein said agitation is an oscillating movement at a frequency of approximately 200 to 225 r.p.m. and an amplitude of approximately 2 to 3 inches.

9. The method according to claim 8, wherein said supporting surface is oscillated substantially in its own plane.

10. The method according to claim 1, wherein the mixture is stratified into at least one additional stratum intermediate of said upper and lower strata, further comprising separating said intermediate stratum from said upper and lower strata substantially along planes parallel to said strata.

References Cited

UNITED STATES PATENTS

| | | | |
|---|---|---|---|
| 1,252,273 | 1/1918 | Lever | 209—44 |
| 440,460 | 11/1890 | Taylor et al. | 209—479 |
| 1,068,162 | 7/1913 | Payne | 209—493 X |
| 2,462,645 | 2/1949 | Knowland | 209—467 X |
| 2,677,463 | 5/1954 | Bolhar et al. | 209—493 X |

FOREIGN PATENTS 277,817   9/1927   Great Britain.

OTHER REFERENCES

Dorris: "Fiber-Free Rubber for Reclaim," Rubber Age, September 1952, vol. 71, pp. 773–780 and 821, TS–1870–R6.

TIM R. MILES, Primary Examiner

U.S. Cl. X.R.

209—44, 493; 241—79.1